REEL WITH RADIAL STRESS ABSORBER

Filed Oct. 20, 1965

INVENTOR.
LAZZARO A. FATTORI
BY
Barnett & Barnett
ATTORNEYS

United States Patent Office 3,395,872

Patented Aug. 6, 1968

3,395,872

REEL WITH RADIAL STRESS ABSORBER

Lazzaro A. Fattori, 84 Rose Ave.,
Woodcliff Lake, N.J. 07675

Filed Oct. 20, 1965, Ser. No. 498,745
6 Claims. (Cl. 242—71.8)

This invention relates to reels for magnetic tape and more particularly is directed to an improved hub construction for absorbing radially inward stress exerted by the tape being wound on the hub and eliminating distortion and warpage of the reel flanges.

The flanges of magnetic tape reels and particularly those subject to tight winding of tape have been found to be subject to considerable distortion and warping which impairs their proper operation. Strengthening the flanges and/or hub construction as a solution to the problem is not only attended by the obvious disadvantage of increased weight and cost but also has failed to satisfactorily correct the condition particularly in plastic molded reels because of cold flow of thermoplastic material when under stress.

Accordingly, among the objects of the invention is to provide a hub construction for tape reels of the character described incorporating a floating ring on which the tape is wound, which ring shall be capable of absorbing radial stress exerted inwardly, that is, toward the center of the reel, by the tightness of the wound tape thereby eliminating distortion and warping of the flanges, which hub construction shall be particularly adaptable to reels of resinous plastic material enabling low cost quantity production by injection molding methods requiring a minimum of material, which reels shall comprise few and simple parts that are easy to assemble with a minimum of labor, and which shall be practical and efficient to a high degree in use.

Other objects of the invention will in part be obvious and in part hereinafter pointed out.

The invention accordingly consists of features of construction, combination of elements and arrangement of parts which will be exemplified in the construction hereinafter disclosed, the scope of the application of which will be indicated in the claims following.

In the accompanying drawing in which an illustrative embodiment of the invention is shown:

Figure 1:
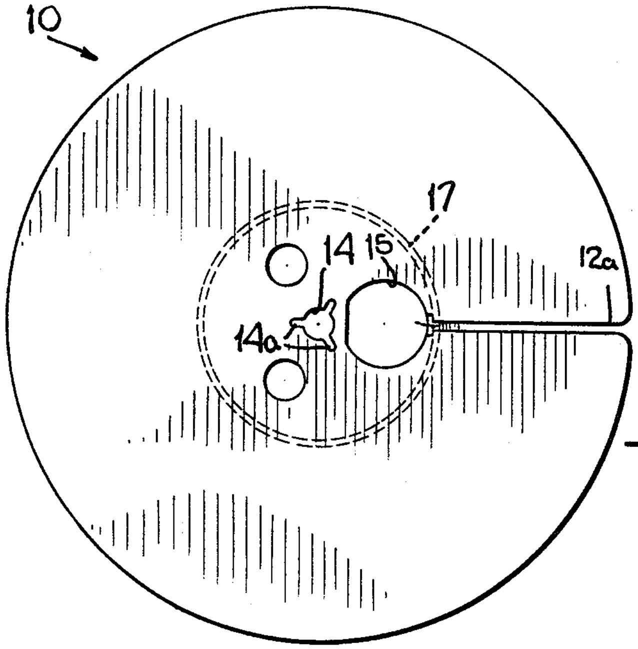
FIG. 1 is a plan view of a reel constructed to embody the invention.
Figure 5:
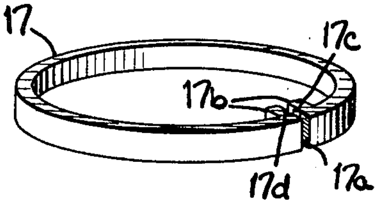
FIG. 5 is a perspective view of the ring removed from the reel hub.
Figures 2, 3, 4:
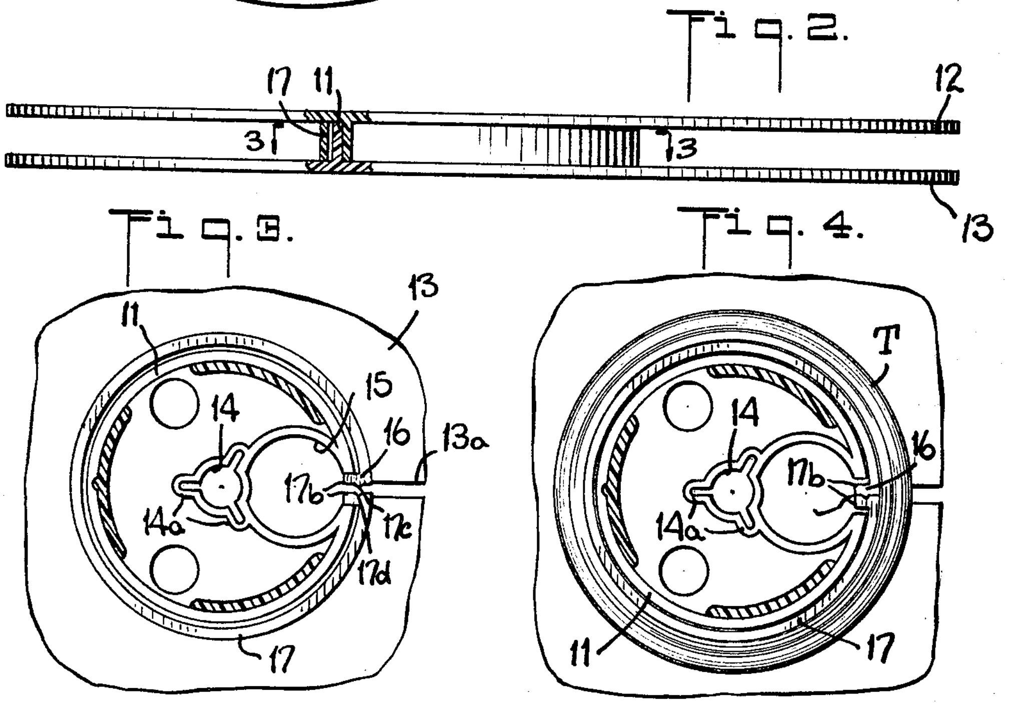
FIG. 2 is an enlarged side view of the reel shown in FIG. 1.
FIG. 3 is a fragmentary enlarged sectional view taken on line 3—3 in FIG. 2.
FIG. 4 is a fragmentary enlarged sectional view similar to FIG. 3 but showing the ring in a compressed condition by tape wound thereon.

Referring in detail to the drawing, 10 generally denotes a reel of the type on which magnetic tape T is wound. Reel 10 may be of any conventional construction made of a suitable molded resinous plastic such as, but not limited to, polystyrene and may comprise a hub 11 mounting a pair of opposite flanges 12 and 13.

Hub 11 is shown to include a conventional central opening 14 for mounting on a spindle with one or more keyways 14*a* and an eccentric opening 15 communicating with a cut-out 16 in the cylindrical wall of hub 11.

The invention contemplates a radial stress absorber concentrically carried to encircle hub 11 but being physically detached and separate from hub 11 and flanges 12 and 13. Such stress absorber is here shown as a floating ring 17 which may be split at 17*a* to permit passage of a leading end of tape T therethrough to facilitate anchoring. The opposite ends of ring 17 may terminate in thickened portions or bosses 17*b* which are sized to project inwardly into cut-out 16. Bosses 17*b* and cut-out 16 are proportioned to permit opening of split 17*a* sufficiently to easily pass tape T therethrough.

To further facilitate threading of a leading end of tape T through split 17*a*, radial slits 12*a* and 13*a* may be formed in one or both flanges 12 and 13, respectively, to extend from the peripheral edge of each of said flanges into eccentric opening 15. The facing surfaces of bosses 17*b* are seen to include a tongue 17*c* and groove 17*d* for improving the gripping of the leading end of tape T by said bosses 17*b*.

The practical utility and operation of reel 10 fitted with radial stress absorber or ring 17 will now be apparent. Ring 17 is proportioned so that its inside diameter is larger than the outside diameter of hub 11 when split 17*a* is completely closed, that is, ring 17 in completely closed condition is concentrically spaced from hub 11 and is of a width slightly less than the spacing between flanges 12 and 13. A leading end of tape T is readily threaded onto reel 10 by passing a length thereof sidewise through one of the slits 12*a* or 13*a* and split 17*a* so that the leading end of tape T enters eccentric opening 15. Tape T is then wound onto reel 10 in the well understood manner, the tape being carried entirely by ring 17 which rotates with hub 11 due to engagement of bosses 17*b* in cut-out 16, but is otherwise structurally independent of hub 11 and flanges 12 and 13 thereby preventing transmission of any stress and strain exerted by the wound tape T to hub 11 and flanges 12 and 13.

For the purpose of illustration but not limiting the scope of the invention, a seven inch diameter reel molded of polystyrene for accommodating magnetic tape of one-quarter inch width fitted with a polystyrene ring 17 having a thickness of .080 of an inch and sized to render a radially concentric spacing on the order of .010 of an inch between hub 11 and ring 17 when split 17*a* is completely closed, renders satisfactory results. When tightly wound with tape T, the compressed state of ring 17 is manifest by said concentric spacing between ring 17 and hub 11 being visibly reduced. In larger reels the thickness of ring 17 and/or the concentric spacing from hub 11 may be increased to absorb the greater stress exerted by a larger quantity of tape T.

The improved reel with radial stress absorber herein disclosed is seen to achieve the several objects of the invention and to be well adapted to meet conditions of practical use. As various possible embodiments might be made in the above invention, and as various changes might be made in the disclosed construction, it is to be understood that all matters herein set forth or shown in the accompanying drawing are to be interpreted as illustrative and not in a limiting sense.

Having thus described my invention, I claim as new and desired to secure by Letters Patent:

1. A warp resistant reel for receiving tightly wound tape having a hub supporting a pair of opposite spaced flanges, a normally open split ring floating between said flanges and concentric with said hub, said ring being constructed and arranged to close when wound with tape and when closed and fully loaded with tape to be radially concentrically spaced from said hub forming a carrier for said tape independent of said hub and flange.

2. The warp resistant reel defined in claim 1 in which said hub has a cylindrical wall extending between said flanges formed with a cut-out, said ring having means extending radially inward into said cut-out to limit relative rotation between the hub and ring.

3. The warp resistant reel defined in claim 1 in which said hub has a cylindrical wall extending between said flanges formed with a cut-out, said ring having the opposite ends adjacent the split terminating in thickened portions sized to project inwardly into said cut-out to limit the exent of said normal split opening.

4. The warp resistant reel defined in claim 1 in which said hub and flanges are formed of resinous plastic material.

5. The warp resistant reel defined in claim 1 in which said hub, flanges and ring are formed of resinous plastic material.

6. The warp resistant reel defined in claim 3 in which the facing surfaces of said thickened portions are formed with interfitting tongue and groove means.

References Cited

UNITED STATES PATENTS

| | | | |
|---|---|---|---|
| 2,881,985 | 4/1959 | Overmire et al. | 242—71.8 |
| 681,719 | 9/1901 | Mark. | |
| 1,175,916 | 3/1916 | Anderson | 242—74 |
| 1,386,617 | 8/1921 | Gunderman | 242—74 |
| 2,508,651 | 5/1950 | Pratt et al. | 242—74 X |
| 3,223,342 | 12/1965 | Brandon | 242—74.2 |

FRANK J. COHEN, *Primary Examiner.*

NATHAN L. MINTZ, *Assistant Examiner.*